Aug. 9, 1960

H. A. HALEY 2,948,582

PROCESSING OF VISCOSE RAYON CAKES
CONTAINING POLYACRYLAMIDE RESIN
Filed May 20, 1957

United States Patent Office 2,948,582
Patented Aug. 9, 1960

2,948,582
PROCESSING OF VISCOSE RAYON CAKES CONTAINING POLYACRYLAMIDE RESIN

Harold A. Haley, Glenolden, Pa., assignor to American Viscose Corporation, Philadelphia, Pa., a corporation of Delaware Filed May 20, 1957, Ser. No. 660,127

8 Claims. (Cl. 18—54)

This invention is directed to a process of spinning into rayon yarn a viscose containing a linear acrylic type of resin, and subsequently contacting the yarn with formaldehyde and curing to form an acrylic resin-formaldehyde condensate in situ. More specifically the invention is directed to reducing the swelling of this type of yarn during the wet-processing which follows the extrusion stage.

Figure 1:
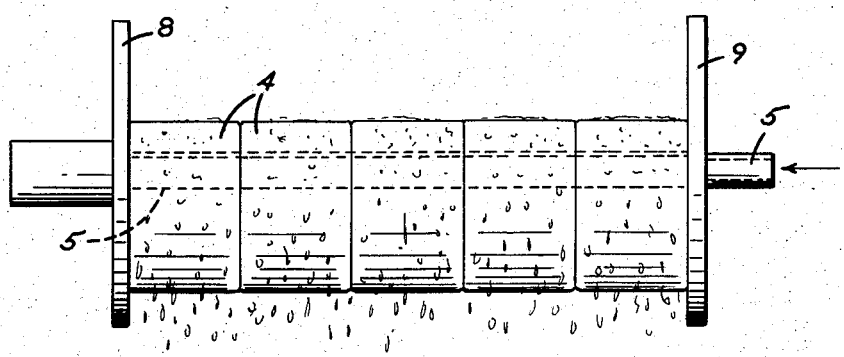
Figure 1 depicts a bar loaded with cakes for wet processing.
Figure 2:
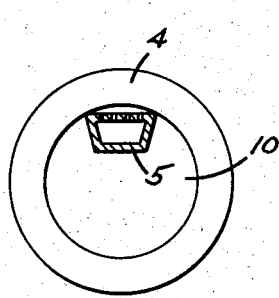
Figure 2 shows a normal cake being wet-processed.

In conventional box-spinning, viscose is extruded through a spinneret into an acid bath to form coagulated filaments and these are collected in the form of a cake. The cake is then wet-processed to complete the regeneration of the cellulose and to remove impurities therefrom. In preparation for the wet-processing, groups of cakes 4 are placed end-to-end on metal bars or arms 5 (Figs. 1–3) which pass through the hollow cores of the cakes. These arms 5 have a hollow center 6 and are perforated their full length to permit liquids to flow through the bar and out the sides. A row of cakes is loaded on the arm and the latter is placed on a conveyor means along with a group of other arms similarly loaded. Flanges 8, 9 are fitted against the ends of the cakes to press them firmly together. The loaded arms are then moved forward by the conveyor through a series of stations wherein a treating liquid enters the protruding end of arm 5, flows through the arm and out through the cakes and porous sheath. A different processing liquid is injected through arm 5 into the cakes at each station, generally these consist of water first, then a desulfiding solution, a water rinse, a bleach, an acid, an antichlor, a water wash, and a lubricant finish. An appreciable pressure build-up occurs in the cylindrical space 10 at the interior of the cakes 4. The cakes must remain round for normal processing (Fig. 2); this maintains the seal so that processing solutions flow evenly through all cakes. All the steps of wet-processing require that the cake maintain its round form so that the liquid will penetrate the cake uniformly in each stage.

Figure 3:
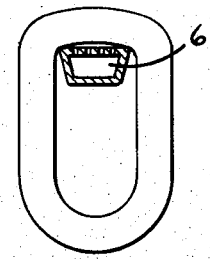
Figure 3 shows a collapsed cake in the same process.

A certain amount of lateral cake swelling occurs, of course, about 25% in the case of a conventional rayon cake. If the cake swells abnormally it crowds all the cakes on the arm 5 against each other, jamming them together so tightly that it is difficult for the liquid to penetrate through them. This deformation of the cakes also causes matting up of the interior of the cakes; the threads become cross-laid, etc. Such a cake must be sold as "seconds" or as scrap since it is difficult to cone or wind the yarn from the finished cake. The cake may even blow-out and collapse as shown in Figure 3, letting all of the processing liquid in space 10 escape through it. The collapse of one cake breaks the seal and ruins all the other cakes on the arm because none of the subsequent processing liquids permeate the other cakes, and it is impractical to stop the conveyor to replace the collapsed cake. It is evident from the foregoing discussion that a yarn which swells abnormally during cake processing has little commercial value.

In Serial No. 266,243, now Pat. No. 2,858,185, filed January 12, 1952, Joseph W. Schappel, it was pointed out that a class of linear acrylic resins, which will be defined later but which is illustrated by polyacrylamide, can be injected into viscose and the viscose spun; the resulting yarn, after treatment with formaldehyde, a cross-linking catalyst, and heat cure is dimensionally stable due to lowered water swelling. The objection to this method is that when a polyacrylamide resin alone is injected into viscose and the yarn spun into cakes and wet-processed by conventional means to remove impurities, the cake swells abnormally, beginning during the desulfiding step and continuing through the other processing steps, leading to the consequences described above. The cakes may collapse, causing incomplete processing. As a result the finished cakes may contain acid, have discolored sections, and dye poorly so the yarn is non-commercial.

In application Serial No. 368,530, filed July 16, 1953, Schappel covers the mixing of formaldehyde with polyacrylamide or derivatives thereof to form a methylolated polyacrylamide on contact with viscose; the yarn spun from this is treated with an acid catalyst and heat cured to produce a dimensionally stable fiber. The difficulty with injecting mixtures of polyacrylamide and formaldehyde into viscose and then spinning is that there are localized dead spots in the system such as lines, filters and jets where the polyacrylamide and formaldehyde react or "gel" to form plugs. The cakes also can be so hard and porosity so low that processing is impossible.

With the foregoing situation in mind the object of this invention is to produce a processable rayon from a viscose containing a polymer of acrylamide or substituted acrylamide. A further objective is to develop a method of injection spinning of an acrylamide type of polymer which will permit normal processing of the yarn. A further object is to produce a level-dyeing rayon containing a polyacrylamide resin which can be cake-processed without difficulty.

I have found when very small amounts of formaldehyde are incorporated into a viscose containing polyacrylamide the spinning is not affected, and cake swelling is reduced so that the cakes can be processed normally. The amount added must be quite insufficient to fully react with the amide groups in the polyacrylamide. To fully react polyacrylamide with formaldehyde the following stoichiometric relation would be obtained, considering the polymer, for simplicity, as simple multiples of acrylamide:

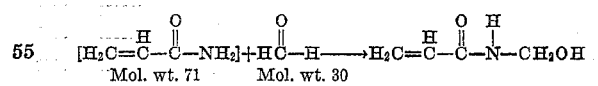

Mol. wt. 71     Mol. wt. 30

Since formaldehyde reacts with acrylamide in a 1:1 molar ratio as shown above it follows that in terms of weight the ratio of formaldehyde:polyacrylamide when fully reacted is 30/71 or aproximately 0.42. As a practical matter it is necessary to employ an excess of formaldehyde to drive this reaction to completion. I add only about 1–4.6 pounds of 100% formaldehyde per 100 pounds of polyacrylamide, enough to react with about 2–11% of the acrylamide units in the linear polymer, then wet-process as described above; I add the balance of the formaldehyde after the wet-processing is finished, and then heat cure.

As an example I accomplish good spinning and cake processing of 75 and 150 denier textile yarn containing 2.0 to 5.0% polyacrylamide by weight based on the cellulose when I add to the viscose 30 milliliters of 36.5% formaldehyde solution per pound polyacrylamide or 0.026 pound 100% formaldehyde per pound polyacrylamide. Comparing this with the stoichiometric ratio of 0.42 it can be seen that the polyacrylamide is only .026/.42 reacted, or about 6%.

The polyacrylamide resin is usually injected as a 6 to 7% solution in water at a viscose blending station very close to the spinning machine. I prefer to premix 0.020 to 0.050 pound 100% formaldehyde per pound of polyacrylamide and inject this formaldehyde-polyacrylamide resin mixture into the viscose just upstream from the spinneret. The normal pH of this solution is about 4.0. It has been found that with this small amount of formaldehyde the mixture is stable, but I normally adjust the pH to 7.0 to reduce any possible gelling tendency.

Where spinning is imminent, an aqueous solution of the required amount of formaldehyde may be injected into the viscose separately from the aqueous solution of the polymer but adjacent the point of introduction of the latter, in which event the pH of the dispersions containing the polymer and the aldehyde separately may have any value. This small amount of formaldehyde is considerably below the amount indicated in Schappel application Serial No. 368,530 and is added to improve cake processing only, with no benefit realized in the final high temperature cure which still requires the normal formaldehyde and acid catalyst soak.

While the amount of formaldehyde added before spinning is preferably within the range of 2–11% of stoichiometric, the exact amount of formaldehyde in any case would have to be found by experiment. If too much is used, spinning will be bad and the cakes will be very hard. When too little is used the cakes become soft and collapse during processing.

After wet-processing the cake by the conventional steps of regeneration, desulfurization, washing, bleaching, soft finishing, etc., the yarn is treated with formaldehyde in excess of the stoichiometric amount required to fully react with the unreacted amide units and is then thermally cured in the presence of an acidic cross-linking catalyst.

Normal rayon will retain, under a given set of conditions, from 100–110% of its dry weight of water. But when the yarn has been resin-spun and cake processed in the manner described herein, and when the balance of the formaldehyde has been added with curing, the water retention of the textile will be reduced to about 40%. Curing effects permanent modification of the moisture pick-up and retention capacity of the regenerated cellulose yarn and control of its cross-sectional swelling through bringing the reaction between the formaldehyde, polyacrylamide, and cellulose to completion. This is accomplished by heating the textile or fiber to 100–170° C. in the presence of an acidic cross-linking catalyst for 1–30 minutes, heating time varying inversely with the temperature, to effect curing. As a practical example, a yarn spun with 3½% by weight of polyacrylamide based on cellulose would be soaked in 3.7% formaldehyde and 1% diglycollic acid catalyst, and cured at 157° C. for 5 minutes. It is believed that the resultant modification of the regenerated cellulose stems primarily from reaction between the molecules of the resin and the formaldehyde, with the formation of bonds or bridges which span the cellulose chains and serve to stabilize them, although the possibility of cross-linking of hydroxyl groups on the cellulose chains is not excluded. The useful curing catalysts are water-soluble weak acids and acid salts which are well-known in the art for this purpose and need not be further discussed here.

The viscose used may have any spinnable composition, and the setting bath into which the modified viscose is extruded may be a coagulating and cellulose-regenerating bath of the composition normally used in the manufacture of fibers or yarns from viscose.

EXAMPLE

The following table sets forth a series of runs wherein polyacrylamide was injection-spun into viscose, the formaldehyde added in one of the two ways already described, as indicated by the footnotes, and the yarn cake processed by the conventional steps described above. The percent polyacrylamide by weight, based on the weight

*Table*

| Run | Lbs. $CH_2O$ per lb. PAM | Maximum Percent Amide Groups Reacted | Note | Effect on Spinning | Unprocessed Cake Appearance | Cake Processing |
|---|---|---|---|---|---|---|
| 1 | none | | 1 | normal | normal | Cakes swell, collapse, very difficult processing. |
| 2 | .211 | 50. | 2 | bad gelling in jets. | extra hard | Too hard for processing. |
| 3 | .211 | 50. | 3 | gelling in jets. | hard | Cakes hard, porosity low. Processing poor. |
| 4 | .105 | 25. | 3 | slight gelling in jets. | slightly hard. | Cakes hard, no collapsing. Processing fair. |
| 5 | .046 | 11. | 3 | normal | normal | Porosity low, processing poor. |
| 6 | .042 | 10. | 3 | normal | normal | No collapsing, processing good. |
| 7 | .031 | 7. | 3 | normal | normal | No collapsing, processing good. |
| 8 | .026 | 6. | 3 | normal | normal | No collapsing, processing good. |
| 9 | .021 | 5. | 3 | normal | normal | No collapsing, processing good. |
| 10 | .010 | 2. | 3 | normal | normal | Some collapsing, processing fair. |
| 11 | .026 | 6. | 3 | normal | normal | No collapsing, processing good. |
| 12 | .026 | 6. | 3 | normal | normal | No collapsing, processing |

*Note 1.*—Polyacrylamide resin solution at 6.5% concentration injected into viscose. No formaldehyde added. Spinning is good and cakes before processing are normal. These cakes while undergoing pressure processing to remove impurities swell abnormally and collapse which results in "blow outs" and practically impossible processing.

*Note 2.*—Formaldehyde and polyacrylamide mixture 60° C. for two hours at pH 9.5 to form methylolated polyacrylamide. Solution cooled and pH adjusted to 7.0. When this was injected into viscose gelling occurred in blender, filters and jets. Spinning was poor and cakes were extremely hard. No processing attempted.

*Note 3.*—Formaldehyde and polyacrylamide mixed without heating. pH this mixture usually approximately 4.0 and this was adjusted to pH 7.0 to eliminate any gelling during storage before injecting into viscose.

of the cellulose in the viscose, was 3.5% in all the examples. The bleach was Na—O—Cl at 27° C. having .09% available chlorine and a pH of 10. In the first 9 runs the yarn was 75/30 (75 denier, 30 filament) and in the remaining runs the yarn was a 150/40. To appreciate the significance of the formaldehyde:polyacrylamide ratio in the second column of the table one must compare this figure with .42 which represents a normal 1:1 mol ratio of formaldehyde:polyacrylamide. The actual ratio, in terms of maximum amide groups reacted, is seen in the third column. Thus, run #5 which employs a formaldehyde:polyacrylamide ratio of .046 contains only about 11% of the stoichiometric equivalent of formaldehyde to polyacrylamide and also marks the upper limit of this figure so far as this table goes. So far as the table indicates the lower limit is in run #10 which employs about 2% of the stoichiometric requirement of formaldehyde.

The percent of polyacrylamide in parts by weight based on cellulose is not critical for the purpose of this invention but would normally be in the range of 2–15%. While the foregoing discussion has been in terms of polyacrylamide the invention is not restricted to this particular polymer but broadly is applicable to linear homopolymers and copolymers of a monoamide having the general formula:

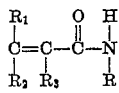

in which each of R, $R_1$, $R_2$, and $R_3$ are selected from the group consisting of hydrogen, methyl, and ethyl, and may be the same or different than one or more others of the group. Polymeric amides of relatively high molecular weight may be used and those polyamides which, in concentrations of 10% in water containing 1% of isopropanol by weight have a specific viscosity of 300 centipoises to 6000 centipoises are preferred.

The polymer may be produced (1) by polymerizing or copolymerizing acrylamide or a substituted acrylamide (within the definition hereinabove) to obtain a reactive polymer of an acrylamide, or (2) by hydrolyzing a polymer or copolymer of acrylonitrile or an alkyl-substituted acrylonitrile, such as methacrylonitrile, to produce a polymeric product in which at least 30% of the monomeric units comprise amido groups. The polymeric products may be produced by standard solution or emulsion polymerization techniques such as in the presence of a peroxy catalyst such as potassium persulfate.

When copolymers are used, the monomeric unit other than that containing the amide group may be any other ethylenically unsaturated monomer, such as vinyl acetate, vinyl chloride, vinyl alcohol, acrylic acid, acrylonitrile, methacrylic acid, methacrylonitrile, vinylidene chloride, ethylene, etc., or mixtures thereof. Also, in using method (2), the hydrolyzed product may contain nitrile and/or carboxyl groups as well as amido groups if it is derived from polyacrylonitrile or from polymethacrylonitrile. It may also contain other groups, such as hydroxyl and/or acetate groups if derived from copolymers, such as a copolymer of acrylonitrile and vinyl acetate.

I claim:

1. In a process wherein viscose containing polyacrylamide is box-spun, the yarn is cake-processed to remove impurities therefrom, and the processed yarn is treated with formaldehyde and thermally cured to form a resinous condensate of the polyacrylamide and formaldehyde, the improvement comprising adding a small amount of formaldehyde to the viscose along with the polyacrylamide prior to spinning, the amount of formaldehyde being sufficient to monomethylolate between about 2 and 11% of the amide groups in the resin, whereby the swelling of the yarn during cake-processing is reduced.

2. In a method of producing a regenerated cellulose yarn in which a viscose solution is passed through a spinneret into a liquid coagulating bath to form filaments, the improvement which comprises adding to the viscose before it enters the bath formaldehyde and a linear polyamide, the amount of formaldehyde being sufficient to monoethylolate between about 2 and 11% of the amide units of the polymer, said polymer being selected from the group consisting of homopolymers of the amide and copolymers of at least 30% by weight of the amide with other ethylenically unsaturated monomers, the amide units having the general formula:

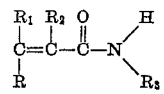

in which each of R, $R_1$, $R_2$, and $R_3$ are selected from groups consisting of hydrogen, methyl, and ethyl, wet-processing the yarn in cake form to remove spinning impurities therefrom, contacting the processed yarn with sufficient additional formaldehyde to react unreacted amide groups in the polymer, and heating the yarn to cure the resin to an insoluble reaction product in and distributed throughout the yarn.

3. The process of claim 2 wherein the formaldehyde and polymer are added to the viscose in the form of a mixture.

4. A method as defined in claim 2 in which the polyamide and formaldehyde are pre-reacted to form a methylolated polyamide, and the latter is added to the viscose.

5. The process of claim 2 wherein the formaldehyde and polymer are added separately to the viscose.

6. A process of preparing a regenerated cellulose filament having improved dimensional stability comprising adding to viscose a member of the group consisting of (1) formaldehyde and a stoichiometric excess of a linear polymer of a monoamide, said polymer being selected from the group consisting of homopolymers of the amide and copolymers of at least 30% by weight of the amide with other ethylenically unsaturated monomers, said monoamide units having the general formula:

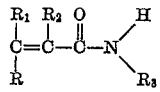

in which each of R, $R_1$, $R_2$, and $R_3$ are selected from groups consisting of hydrogen, methyl, and ethyl, and (2) the aforesaid linear polymer having between about 2 and 11% of its amide group methylolated; extruding the resulting viscose into a coagulating bath to form a filament therein, withdrawing the filament from the bath, and collecting it in the form of a cake, processing the cake with a series of liquids including an acid, water, a desulfiding solution and a bleach so as to clean and whiten the cakes, subsequently contacting the filament with enough additional formaldehyde to supply the stoichiometric amount required to fully combine with the amide groups of the polymer, and heating the filament to complete the reaction between the formaldehyde and polymer, whereby the water retention of the filament is appreciably lowered.

7. Process of claim 6 wherein the polymer is polyacrylamide, and the formaldehyde is added to the viscose separately therefrom.

8. Process of claim 6 wherein the polymer and the formaldehyde are added to the viscose in the form of partially methylolated polyacrylamide.

References Cited in the file of this patent

UNITED STATES PATENTS 2,322,981    Ubbelohde    June 29, 1943
2,858,185    Schappel    Oct. 28, 1958